United States Patent [19]

Cody et al.

[11] Patent Number: 5,034,136
[45] Date of Patent: Jul. 23, 1991

[54] METHOD OF DETACKIFYING PAINT OVERSPRAY USING REDUCED CATION EXCHANGE CAPACITY SMECTITE CLAYS AND ORGANOCLAYS

[75] Inventors: Charles A. Cody, Robbinsville; Edward D. Magauran, Mount Holly, both of N.J.

[73] Assignee: Rheox, Inc., Hightstown, N.J.

[21] Appl. No.: 463,551

[22] Filed: Jan. 11, 1990

[51] Int. Cl.$^5$ .................................................. C02F 1/28
[52] U.S. Cl. ..................................... 210/691; 210/712; 210/714; 210/728; 210/730; 210/930; 55/85
[58] Field of Search .............. 55/85; 134/38; 210/712, 210/714, 725, 727, 728, 729, 930, 691; 427/331

[56] References Cited

U.S. PATENT DOCUMENTS

| | | | |
|---|---|---|---|
| 3,515,575 | 6/1970 | Arnold | 210/712 |
| 3,990,869 | 11/1976 | Forney | 55/19 |
| 4,116,827 | 9/1978 | Sawyer | 210/691 |
| 4,220,456 | 9/1980 | Block | 55/85 |
| 4,504,395 | 3/1985 | Harpel | 210/712 |
| 4,629,572 | 12/1986 | Leitz et al. | 55/85 |
| 4,743,306 | 5/1988 | Jepson et al. | 524/447 |
| 4,861,491 | 8/1989 | Svensson | 210/691 |

FOREIGN PATENT DOCUMENTS

WO88/10142 12/1988 PCT Int'l Appl. ................ 210/691

Primary Examiner—Peter Hruskoci
Attorney, Agent, or Firm—Burns, Doane, Swecker & Mathis

[57] ABSTRACT

The present invention relates a method for detackifying paint overspray comprising contacting the paint overspray with reduced cation exchange capacity smectite clays and organoclays.

15 Claims, No Drawings

METHOD OF DETACKIFYING PAINT OVERSPRAY USING REDUCED CATION EXCHANGE CAPACITY SMECTITE CLAYS AND ORGANOCLAYS

FIELD OF THE INVENTION

The present invention relates to a method of detackifying paint overspray wherein the overspray is contacted with either a reduced cation exchange capacity smectite clay and/or an organically modified reduced cation exchange capacity smectite clay, or a reduced cation exchange capacity smectite clay and a polyelectrolytic quaternary amine.

DISCUSSION OF THE RELATED ART

In industrial processes, automatic paint spraying techniques are often employed, particularly in the automotive and appliance industries. Paint spraying is generally carried out in spray booths, spray stands or against spray walls. The paint overspray is removed from the air by washing out with water. When airborne paint particles are captured by a water curtain, the particles, or their components, can form a scum on the surface of the water reservoir or can sink and accumulate and stick to the bottom of the reservoir. In either case, the paint is difficult to handle because it is tacky and, to the extent that waste can be separated, it contains a large percentage of water. The paint waste adheres to the sump and drain surfaces, and must be periodically removed by a method such as shovelling to prevent clogging of the sump and drain surfaces.

Alkaline compounds which effect denaturing of the paints and hence coagulation have been used to detackify paints. (Jürgen Geke, "Moderne Produckte und Verfahren zur Koagulation," Modern Products and Processes for Coagulation, Oberfläche & JOT 1986, 11, pages 43–46).

European Patent Application No. 187,028 describes a process for detackifying and separating washed-out paint spray from an aqueous wash liquid wherein an aqueous slurry containing a predominant amount of hectorite and a small amount of a diluent is added to the aqueous paint suspension.

It is also known that bentonite clay can be used for coagulating and detackifying an aqueous paint suspension of this type. (H. Kohler, Fachbroschäre Oberflächentechnik, Technical Brochure on Surface Technology, 5/85, pages 65–69).

Co-pending U.S. patent application Ser. No. 07/201,193 describes the use of an organophilic clay as an adsorbent for separating the oil phase of oil-in-water suspensions. The organophilic clays employed therein are the reaction products of an organic cationic compound with a smectite type clay having a cation exchange capacity of at least 75 milliequivalents per 100g of clay.

U.S. Pat. No. 4,564,464 discloses paint detackifying compositions consisting of hectorite clay, thinning agents such as water soluble aliphatic and/or alicyclic amines, and water conditioning agents such as water soluble polyphosphates.

U.S. Pat. No. 4,629,572 discloses detackifying agents for clear oil-based coating compositions composed of (1) a waterdispersible polymeric condensation reaction product of a urea or an amino triazine and an aldehyde and (2) a water-swellable clay.

U.S. Pat. No. 3,723,148 discloses a process for deactivating paint overspray particles using an aqueous alkaline solution which contains a particular organic nitrogen compound. Preferably, the alkaline solution is an aqueous solution of sodium hydroxide and/or sodium silicate and the organic nitrogen compound is triethanolamine.

U.S. Pat. No. 4,470,912 discloses a method for treating polar or aqueous fluid emulsions of an organic composition. The method comprises contacting the emulsion with an organoclay to adsorb a major portion of the organic composition. Preferably, a portion of the water or polar fluid is then removed.

U.S. Pat. No. 4,549,966 discloses a method of removing organic contaminants from an aqueous composition contaminated therewith comprising contacting the aqueous composition with a sufficient amount of organoclay for a sufficient amount of time to absorb a substantial portion of the contaminant, and to form an aqueous organoclay admixture, and then separating the organoclay and aqueous composition from each other.

SUMMARY OF THE INVENTION

The present invention advances the state of the art by providing reduced cation exchange capacity smectite clay products and organically modified reduced cation exchange capacity smectite clay products that exhibit excellent paint detackification properties.

It is an object of this invention to provide reduced cation exchange capacity smectite clays that successfully flocculate polyester melamine and clear coat paint droplets.

It is a further object of the invention to provide such clays that yield a paint floc which floats on the water surface and thus facilitates collection.

It is an additional object of the invention to produce a paint floc that is non-tacky and does not adhere to equipment.

It is yet a further object of the invention to yield a paint floc with a relatively low water content to facilitate collection and disposal.

It is yet an additional object of the invention to produce smectite clays which when used in paint applications, yield a clear water phase which is suitable for recirculation.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the invention provides a method for detackifying paint overspray comprising contacting the paint overspray with a reduced cation exchange capacity smectite clay and/or an organically modified reduced cation exchange capacity clay which optionally may contain a filler, or contacting the paint overspray with a reduced cation exchange capacity smectite clay and a polyelectrolytic quaternary amine.

The reduced cation exchange capacity smectite clays and organically modified smectite clays employed in the method of the invention exhibit excellent paint detackification properties and efficiency. The reduced cation exchange capacity organophilic clays of the invention are less costly to manufacture since the required concentration of quaternary amine, the most expensive raw material, is significantly reduced.

By the method of the invention, it is possible to successfully flocculate paint droplets, yield a paint floc that is not tacky, does not adhere to equipment and floats on the surface of the water phase. Further, the paint floc has a relatively low water content and yields a clear water phase which is suitable for recirculation.

DESCRIPTION OF THE PREFERRED EMBODIMENTS

Reference will now be made in detail to the present preferred embodiments of the invention.

The smectite clays suitable for use in the invention have a cation exchange capacity that is reduced by about 5 meq./100 g clay or greater, preferably about 25 meq./100 g clay or greater. Preferably, a bentonite or hectorite smectite clay having a cation exchange capacity that is reduced by about 5 meq./100 g clay or greater is employed.

Exemplary suitable processes to effect reduction in the cation exchange capacity of smectite clays include calcination at elevated temperatures, acid treatments, ion exchanging with multi-valent cations, and alkaline substitution of monovalent ions into the clay lattice.

Applicants have found that hectorite smectite clays having cation exchange capacity values of from 105 to 115 meq./100g clay, as determined using the methylene blue spot test can be reduced to cation exchange capacity values of from 6 meq./100g to 102 meq./100g clay by calcination at temperatures of from about 300.C to about 700 C for from about 15 minutes to about 4 hours. The methylene blue spot test procedure is set forth in Grimshaw, "The Chemistry and Physics of Clays," pp. 264–265, Interscience (1971), the pertinent disclosure of which is incorporated herein by reference. It is believed that calcination imparts improved properties to the clay.

The smectite clays so reduced can be organically modified by treating the clays with one or more quaternary ammonium compound or polymers containing one or more quaternary ammonium moieties. An exemplary suitable process for organically modifying the reduced cation exchange capacity smectite clays of the invention includes reacting the smectite clays with an amount of dimethyl dihydrogenated tallow ammonium chloride (2M2HT quat) or dimethyl dicoco ammonium chloride effective to satisfy the required cation exchange capacity of the clay. When the reduced cation exchange capacity smectite clays are modified by reacting with polymers containing one or more quaternary ammonium moieties, the clay and polymer can be prereacted and then employed as a detackifier, or the clay and polymer can be added separately and then employed as a detackifier.

Suitable quaternary compounds for use in the invention for organically modifying reduced cation exchange capacity smectite clays include organic cations which are reacted with the clay. The organic cation is preferably an ammonium cation which contains at least one lineal or branched, saturated or unsaturated alkyl group having 12 to 22 carbon atoms. The remaining groups of cation are preferably chosen from (a) lineal or branched alkyl groups having 1 to 22 carbon atoms; (b) aralkyl groups which are benzyl and substituted benzyl moieties including fused ring moieties having lineal or branched 1 to 22 carbon atoms in the alkyl portion of the structure; (c) aryl groups such as phenyl and substituted phenyl including fused ring aromatic substituents; (d) beta, gamma unsaturated groups having six or less carbon atoms or hydroxyalkyl groups having two to six carbon atoms; and (e) hydrogen.

The long chain alkyl radicals may be derived from natural occurring oils including various vegetable oils, such as corn oil, coconut oil, soybean oil, cottonseed oil, castor oil and the like, as well as various animal oils or fats such as tallow oil. The alkyl radicals may likewise be petrochemically derived from such alpha olefins.

Exemplary suitable branched, saturated radicals include 12-methylstearyl and 12-ethylstearyl. Exemplary suitable branched, unsaturated radicals include 12-methyloleyl and 12ethyloleyl. Exemplary suitable unbranched unsaturated radicals include lauryl; stearyl; tridecyl; myristyl (tetradecyl); pentadecyl; hexadecyl; hydrogenated tallow, docosanyl. Exemplary suitable unbranched, unsaturated and unsubstituted radicals include oleyl, linoleyl, linolenyl, soya and tallow.

Examplary suitable aralkyl, i.e., benzyl and substituted benzyl moieties include those materials derived from, e.g., benzyl halides, benzhydryl halides, trityl halides, $\alpha$-halo-$\alpha$-phenylalkanes wherein the alkyl chain has from 1 to 22 carbon atoms such as 1-halo-phenylethane, 1-halo-1-phenyl propane, and 1-halo-1-phenyloctadecane; substituted benzyl moieties, such as those derived from ortho, meta and parachlorobenzyl halides, para-methoxybenzyl halides, ortho, meta and para-nitrilobenzyl halides, and ortho, meta and para-alkylbenzyl halides wherein the alkyl chain contains from 1 to 22 carbon atoms; fused ring benzyl-type moieties, such as those derived from 2-halomethylnaphthalene, 9-halomethylanthracene and 9-halomethylphenanthrene, wherein the halo group is defined as chloro, bromo, iodo, or any other such group which serves as a leaving group in the nucleophilic attack of the benzyl type moiety such that the nucleophilic replaces the leaving group on the benzyl type moiety.

Exemplary suitable aryl groups include phenyl groups such as N-alkyl and N,N-dialkyl anilines, wherein the alkyl groups contain between 1 and 22 carbon atoms; ortho, meta and paranitrophenyl, ortho, meta and para-alkyl phenyl, wherein the alkyl group contains between 1 and 22 carbon atoms, 2-, 3-, and 4-halophenyl wherein the halo group is defined as chloro, bromo or iodo, and 2-, 3-, and 4-carboxyphenyl and esters thereof, where the alcohol of the ester is derived from an alkyl alcohol, wherein the alkyl group contains between 1 and 22 carbon atoms, aryl such as a phenol, or aralkyl such as benzyl alcohols; fused ring aryl moieties such as naphthalene, anthracene, and phenanthrene.

The $\beta,\gamma$-unsaturated alkyl group may be selected from a wide range of materials. These compounds may be cyclic or acyclic, unsubstituted or substituted with aliphatic radicals containing up to 3 carbon atoms such that the total number of aliphatic carbons in the $\beta,\gamma$-unsaturated radical is 6 or less. The $\beta,\gamma$-unsaturated alkyl radical may be substituted with an aromatic ring that likewise is conjugated with the unsaturation of the $\beta,\gamma$moiety or the $\beta,\gamma$-radical is substituted with both aliphatic radicals and aromatic rings.

Exemplary suitable cyclic $\beta,\gamma$-unsaturated alkyl groups include 2-cyclohexenyl and 2-cyclopentenyl. Exemplary suitable 5 acrylic $\beta,\gamma$-unsaturated alkyl groups containing 6 or less carbon atoms included propargyl; allyl(2-propenyl); crotyl(2-butenyl); 2-pentenyl; 2-hexenyl; 3-methyl-2-butenyl; 3-methyl-2-pentenyl;

2,3-dimethyl-2-butenyl; 1,1-dimethyl-2-propenyl; 1,2-dimethyl propenyl; 2,4-pentadienyl; and 2,4-hexadienyl. Exemplary suitable acyclic-aromatic substituted compounds include cinnamyl(3-phenyl-2-propenyl); 2-phenyl-2-propenyl; and 3-(4- methoxyphenyl)-2-propenyl. Exemplary suitable aromatic and aliphatic substituted materials include 3-phenyl-2-cyclohexenyl; 3-phenyl-2-cyclopentenyl; 1,1-dimethyl-3-phenyl-2-propenyl; 1,1,2-trimethyl-3-phenyl-2-propenyl; 2,3-dimethyl-3-phenyl-2propenyl; 3,3-dimethyl-2-phenyl-2-propenyl; and 3-phenyl-2butenyl.

The hydroxyalkyl group is selected from a hydroxyl substituted aliphatic radical wherein the hydroxyl is not substituted at the carbon adjacent to the positively charged atom, and the group has from 2 to 6 aliphatic carbons. The alkyl group may be substituted with an aromatic ring independently from the 2 to 6 aliphatic carbons. Exemplary suitable groups include 2-hydroxyethyl (ethanol); 3-hydroxypropyl; 4-hydroxypentyl; 6hydroxyhexyl; 2-hydroxypropyl (isopropanol); 2-hydroxybutyl; 2hydroxypentyl; 2-hydroxyhexyl; 2-hydroxycyclohexyl; 3-hydroxycyclohexyl; 4-hydroxycyclohexyl; 2-hydroxycyclopentyl; 3hydroxycyclopentyl; 2-methyl-2-hydroxypropyl; 1,1,2-trimethyl-2hydroxypropyl; 2-phenyl-2-hydroxyethyl; 3-methyl-2-hydroxybutyl; and 5-hydroxy-2-pentenyl.

The organic cation has at least one of the following formulae:

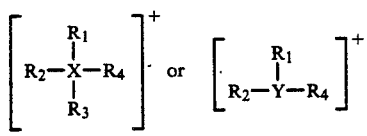

wherein X is nitrogen or phosphorus, Y is sulfur, $R_1$ is the long chain alkyl group and $R_2$, $R_3$ and $R_4$ are representative of the other possible groups described above.

An exemplary suitable organic cation contains at least one lineal or branched, saturated or unsaturated alkyl group having 12 to 22 carbon atoms, at least one lineal or branched, saturated or unsaturated alkyl group having 1 to 12 carbon atoms and at least one aralkyl group having lineal or branched, saturated or unsaturated alkyl group having 1 to 12 carbons in the alkyl portion.

The amount of organic cation reacted with the reduced cation exchange capacity smectite-type clay depends upon the specific clay and the desired degree of hydrophobicity. Typically, the amount of cation ranges from about 75% to about 150% preferably from about 90% to about 130% of the cation exchange capacity of the clay. Thus, for example, when reduced cation exchange capacity bentonite of 55 meq. is used, the amount of cation reacted with the clay will range from about 41 to about 83 milliequivalents, preferably from about 49 to about 72 milliequivalents per 100 grams of clay, 100% active basis.

Additional exemplary suitable quaternary ammonium compounds for organically modifying reduced cation exchange capacity smectite clays include diquaternary ammonium compounds such as N-hydrogenated tallow pentamethyl propane diammonium dichloride of the formula

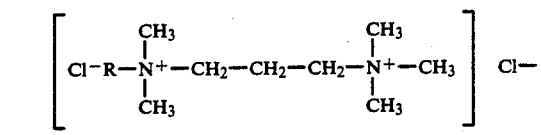

wherein R represents hydrogenated tallow

Exemplary suitable polyquaternary ammonium compounds for organically modifying reduced cation exchange capacity smectite clays include polyquaternary ammonium compounds of the formula

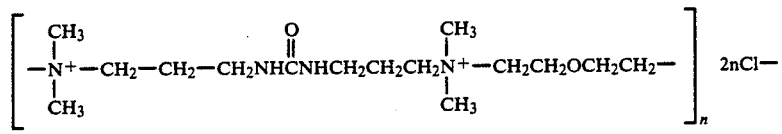

wherein n is 6, such as ureylene quaternary ammonium polymer (Mirapol WT, available from Mirapol, Inc.), as well as Mirapol AD-1 (available from Mirapol, Inc.) a quaternary ammonium polymer of the formula

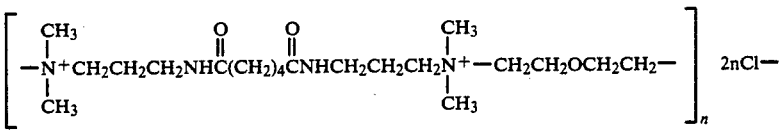

wherein n is 100.

The anion which will normally accompany the organic cation is typically one which will not adversely affect the reaction product or the recovery of the same. Such anions may be exemplified by chloride, bromide, iodide, hydroxyl, nitrite and acetate in amounts sufficient to neutralize the organic cation.

The preparation of the organic cationic salt (i.e., the organic cation paired with the anion) can be achieved by techniques well known in the art. For example, when preparing a quaternary ammonium salt, one skilled in the art would prepare a dialkyl secondary amine, for example, by hydrogenation of nitriles, see U.S. Pat. No. 2,355,356, and then form methyl dialkyl tertiary amine by reductive alkylation using formaldehyde as a source of the methyl radical. According to procedures set forth in U.S. Pat. No. 3,136,819 and U.S. Pat. No. 2,775,617, a quaternary amine halide may then be formed by adding benzyl chloride or benzyl bromide to the tertiary amine. The pertinent disclosure o the above three patents is hereby incorporated by reference.

Applicants have found that certain calcined hectorite clays exhibit significantly improved detackification properties for clear coat formulations compared to detackification achieved using uncalcined hectorite clays. Applicants have also found that certain organically modified calcined hectorite clays display significantly improved detackification efficiency for polyester melamine and clear coat formulations compared to organically modified uncalcined hectorite clays.

Applicants have found that the presence of gangue or filler enhances the paint detackification properties of smectite clays, reduced cation exchange capacity smectite clays and organically modified reduced cation exchange capacity smectite clays as well as organically modified smectite clays. As used herein, the term "gangue" means the nonclay portion of a mined clay, such as bentonite or hectorite. Preferably, the gangue or filler is employed in an amount of from about 5% to about 75% filler or gangue based on the weight of the clay, organoclay, and filler or gangue, most preferably from about 15% to about 45% filler or gangue based on the weight of the clay and/or organoclay and filler or gangue.

The inventors have found that the gangue may provide additional beneficial properties to organoclay paint detackification. For example, when conventional organoclays (no gangue component) are employed as detackifying agents in a spray booth, the initial paint floc generated is sticky in consistency. This initial sticky phase, which is highly undesirable, does not disappear until later in the paint spray addition. In contrast, organoclays based on crude hectorite clay (organoclay plus gangue component) do not exhibit the initial sticky phase. It is believed that the presence of relatively small particle size gangue in conjunction with the relatively large particle size organoclay leads to a flocculated state where the paint droplet is attached to the large organoclay particle and small gangue particles surround and coat the paint eliminating stickiness. Without gangue or filler present, the relatively large particle size conventional organoclay becomes coated with paint and is therefore sticky while floating on the water surface. Upon slight working, the paint particles become entrapped within the conventional organoclay and detackification is achieved.

Synthesis of successful organoclay detackifying compositions using crude hectorite clay represents a significant cost savings as the clay benificiation process for removal of gangue is not required.

Exemplary suitable gangue or fillers for use in the invention include calcium carbonate, dolomite, calcite, silica, silica dioxide, quartz, and metal oxides such as calcium oxide and zinc oxide.

The reduced cation exchange capacity smectite clays and organically modified clays of the invention may be treated with wetting agents, suspending agents, surfactants or dispersants to yield compositions which remain more uniformly distributed in the water circulating system. Other conventional additives, such as preservatives and defoaming agents, may also be added to the clays or organically modified clays of the invention.

Preferably, when a dispersing aid is employed, it is added in an amount of from about 0.5% to 1.0% loading based on the organoclay weight. Preferably, Tamol SG-1 and Tamol 731, manufactured by Rohm & Haas Co., is employed as dispersing aids.

The invention will be further clarified by the following examples which are intended to be purely exemplary of the invention.

EXAMPLE 1

A portion of hectorite clay which had previously been slurried in water, centrifuged to remove non-clay impurities and dried in the plant drum dryer was calcined 4 hours at 600° C. The cation exchange capacity (CEC) as determined using the methylene blue spot test was 54.6 meq./100g clay.

EXAMPLE 2

100g of deionized water was weighed into a 4 oz. bottle and the pH of the water adjusted to 7 with the addition of sodium hydroxide. 0.33 g of the calcined clay of Example 1 was charged into the water, the bottle capped and shaken to disperse the clay. Next, 0.5 g of a Basecoat Clear (BASF, 727) diluted 30% with xylene was added, the bottle capped and reshaken. It was observed that the calcined hectorite successfully flocculated the clear coat. The flocculated material floated on the water surface and was non-tacky in nature. The water phase was clear to only very slightly cloudy.

COMPARATIVE EXAMPLE A

The calcined clay of Example 2 was replaced with 0.33 g of uncalcined beneficiated hectorite with a CEC, as determined using the methylene blue spot test, of 105.4 meq./100g clay. 0.5g of the 70/30 Basecoat Clear/xylene formulation was introduced, the bottle capped and reshaken. It was observed that very little flocculated material was formed. The little flocculated material present was tacky in nature. The water phase was cloudy.

Thus, this work demonstrated a significant advantage of the calcined clay over the uncalcined clay in the detackification of a clear coat formulation.

EXAMPLE 3

20g of the calcined clay of Example 1 was introduced to 980g of water and placed in a 3 liter reaction vessel. The resulting calcined clay slurry was heated to 60° C. with stirring. A charge of 6.60 g of 94.2% active dimethyl dihydrogenated tallow ammonium chloride (55 meq./100g clay) was melted and poured into the clay slurry. The level of 2M2HT employed was sufficient to satisfy the CEC of the clay. The mixture was stirred for 30 minutes at 60° C. and the solids collected on a vacuum filter. The filter cake was washed with hot (50° C.) water and forced air dried at 60° C. for 16 hours. The dried organoclay was ground in a centrifugal mill fitted with a 0.2 mm screen.

COMPARATIVE EXAMPLE B 20 g of uncalcined, beneficiated hectorite clay (CEC =105.4 meq.) was introduced to 980 g of water and placed in a 3 liter reaction vessel. The hectorite clay slurry was heated to 60° C. with stirring. A charge of 12.16 g of 97.4% active dimethyl dihydrogenated tallow ammonium chloride (105 meq./100g clay) was melted and poured into the clay slurry. The level of 2M2HT employed was sufficient to satisfy the CEC of the clay. The mixture was stirred for 30 minutes at 60° C. and the solids collected on a vacuum filter. The filter cake was washed with hot (50° C.) water and forced air dried at 60° C. for 16 hours. The dried organoclay was ground in a centrifugal mill fitted with a 0.2 mm screen.

EXAMPLE 4

100g of deionized water was weighed into a 4 oz. bottle and the pH of the water adjusted to 8-9 with the addition of sodium hydroxide. 0.5 g of the organically modified calcined hectorite clay of Example 3 was charged into the water, the bottle capped and shaken to disperse the organoclay. Next, 0.5 g increments of a polyester melamine paint were added. After the addition of each increment, the bottle was capped, reshaken and allowed to sit for approximately 10 seconds. At this point, the flocculated material and water phase were examined. An endpoint was determined when successful detackification was no longer achieved. Typical observations indicative of an endpoint included the flocculated material becoming tacky on working, the water phase becoming turbid or the presence of free paint. One part of the organically modified calcined hectorite clay detackified nine parts of the polyester melamine paint.

COMPARATIVE EXAMPLE C

The organically modified calcined hectorite clay of Example 4 was replaced with 0.5 g of the organically modified uncalcined hectorite clay of Comparative Example B. One part of the organically modified uncalcined hectorite clay detackified only six parts of the polyester melamine paint.

Thus, Example 4 and Comparative Example C demonstrate that the organically modified calcined clays of this invention provide significantly greater paint detackification efficiency compared to that obtained for organically modified uncalcined clays. In addition to being more efficient, the organically modified calcined clays provide an economic advantage since the required concentration of quaternary amine, the most expensive raw material, is significantly reduced. By lowering the CEC of the clay, an organophilic clay of low quaternary amine m.e. and thus enhanced water dispersibility can be readily manufactured using existing process technology. As would be evident to one skilled in the art, an attempt at synthesizing low quaternary amine m.e. organophilic clays using a high CEC clay source would be difficult. A great proportion of the clay exchange sites would remain unsatisfied and the aqueous reaction mixture consisting of unreacted clay and flocculated organoclay would require excessively long periods of time to filter.

EXAMPLE 5

Organically modified smectite clays were prepared by introducing a charge of melted 2M2HT quaternary amine to an aqueous slurry of smectite clay heated at approximately 60° C. with stirring. For each composition, the level of 2M2HT employed was sufficient to satisfy the CEC of the clay. The mixtures were stirred for 30 minutes at 60° C. and the solids collected on a vacuum filter. The filter cake was washed with hot (50° C.) water and forced air dried at 60° C. for 16 hours. The dried organoclay was ground in a centrifugal mill fitted with a 0.2 mm screen.

The organically modified smectite clays were evaluated for paint detackification efficiency in the following manner. 100g of deionized water was weighed into a 4 oz. bottle and the pH of the water adjusted to 8-9 with the addition of sodium hydroxide. 0.5 g of the organically modified hectorite or calcined hectorite clay was charged into the water, the bottle capped and shaken to disperse the organoclay. Next, 0.5 g increments of a polyester melamine paint were added. After the addition of each increment, the bottle was capped, reshaken and allowed to sit for approximately 10 seconds. At this point, the flocculated material and water phase were examined. An endpoint was determined when successful detackification was no longer achieved. Typical observations indicative of an endpoint included the flocculated material becoming tacky on working, the water phase becoming turbid or the presence of free paint. Data are presented below:

| Detackifying Agent | Paint/Detackifier Weight Ratio Employed To Successfully Detactify Paint |
|---|---|
| Bentone 38 | 5.5:1 |
| 105 me 2M2HT/Hectorite, CEC = 105 me | 6.0:1 |
| 90 me 2M2HT/Hectorite, CEC = 105 me | 7.5:1 |
| 75 me 2M2HT/Calcined Hectorite, CEC = 75 me | 7.0:1 |
| 55 me 2M2HT/Calcined Hectorite, CEC = 55 me | 9.0:1 |
| 35 me 2M2HT/Calcined Hectorite, CEC = 35 me | 9.0:1 |
| 25 me 2M2HT/Calcined Hectorite, CEC = 25 me | 6.0:1 |
| 7 me 2M2HT/Calcined Hectorite, CEC = 7 me | 3.0:1 |

*CEC represents cation exchange capacity.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of detackifying paint overspray containing paint particles and wash water comprising contacting the overspray with a smectite clay which has been treated to reduce its cation exchange capacity by at least 25 meq./100g to a cation exchange capacity of equal to or less than 105 meq./100g, said smectite clay being present in an amount sufficient to flocculate said paint particles and detackify said paint overspray.

2. The method of claim 1 wherein the cation exchange capacity of said smectite clay has been reduced by at least 50 meq./100g clay.

3. The method of claim 1 wherein said smectite clay is a bentonite or hectorite smectite clay.

4. The method of claim 1 wherein said smectite clay has been treated by calcination.

5. The method of claim 1 wherein said contacting is carried out in the presence of a compound selected from the group consisting of gangue and filler.

6. The method of claim 1 wherein said treated smectite clay is organically modified.

7. The method of claim 6 wherein the cation exchange capacity of said smectite clay has been reduced by at least 50 meq./100g clay.

8. The method of claim 6 wherein said smectite clay has been organically modified by reacting said smectite clay with an organic quaternary ammonium compound.

9. The method of claim 8 wherein said organic quaternary ammonium compound is selected from the group consisting of dimethyl dihydrogenated tallow ammonium chloride and dimethyl dicoco ammonium chloride.

10. The method of claim 8 wherein said reaction is carried out in the presence of a compound selected from the group consisting of gangue and filler.

11. The method of claim 1 wherein said smectite clay has been organically modified by reacting said smectite clay with a polymer containing at least one organic quaternary ammonium moiety.

12. The method of claim 11 wherein said reaction has been carried out in the presence of a compound selected from the group consisting of gangue and filler.

13. The method of claim 1 wherein said paint overspray is selected from the group consisting of alkyd paint formulations, polyester melamine formulations and clear coat overspray formulations.

14. The method of claim 1 wherein said smectite clay is treated by calcining at from about 300° C. to about 700° C. for from about 15 minutes to about 4 hours.

15. The method of claim 1 wherein said smectite clay further comprises at least one compound selected from the group consisting of wetting agents, suspending agents, surfactants, dispersants, preservatives and defoaming agents.

* * * * *